United States Patent [19]

Antonelli et al.

[11] Patent Number: 5,667,894
[45] Date of Patent: Sep. 16, 1997

[54] CATHODIC ELECTROCOATING COMPOSITIONS CONTAINING METHANE SULFONIC ACID AS A NEUTRALIZING AGENT

[75] Inventors: Joseph Albert Antonelli, Riverton, N.J.; Christopher Scopazzi, Wilmington, Del.; William Bertus Vanderlinde, Cherry Hill, N.J.

[73] Assignee: E. I. Du Pont de Nemours and Company, Wilmington, Del.

[21] Appl. No.: 659,691

[22] Filed: Jun. 5, 1996

[51] Int. Cl.$^6$ .......................... B32B 27/38; C08L 63/00; C08K 5/36
[52] U.S. Cl. .......................... 428/413; 204/503; 204/505; 523/453; 525/452; 525/504; 525/505; 525/512; 525/528; 522/82
[58] Field of Search ...................... 53/400, 453; 525/452, 525/512, 505, 504, 528; 428/413; 522/82; 204/181.7

[56] References Cited

U.S. PATENT DOCUMENTS

| | | | |
|---|---|---|---|
| 3,681,224 | 8/1972 | Stromberg | 204/181 |
| 3,922,253 | 11/1975 | Jerabek et al. | 260/77.5 |
| 4,137,140 | 1/1979 | Belanger | 204/181 C |
| 4,272,536 | 6/1981 | Inamoto et al. | 424/248.54 |
| 4,339,368 | 7/1982 | Tsou et al. | 523/414 |
| 4,376,687 | 3/1983 | Miyake et al. | 204/181 C |
| 4,419,467 | 12/1983 | Wismer et al. | 523/414 |
| 4,468,307 | 8/1984 | Wismer et al. | 204/181 C |
| 4,594,403 | 6/1986 | Kempter et al. | 528/113 |
| 4,647,604 | 3/1987 | Kempter et al. | 523/402 |
| 4,649,082 | 3/1987 | Friedlander | 428/461 |
| 4,891,111 | 1/1990 | McCollum et al. | 523/415 |
| 4,933,056 | 6/1990 | Corrigan et al. | 204/181.7 |
| 5,070,149 | 12/1991 | DeBroy et al. | 525/296 |
| 5,348,995 | 9/1994 | Anderson | 524/232 |
| 5,356,960 | 10/1994 | Chung et al. | 523/404 |
| 5,468,839 | 11/1995 | Suppes et al. | 524/376 |

FOREIGN PATENT DOCUMENTS 58-117895 7/1983 Japan.

*Primary Examiner*—Randy Gulakowski
*Attorney, Agent, or Firm*—Hilmar L. Fricke

[57] ABSTRACT

An improved aqueous cathodic electrocoating composition having a binder of an epoxy-amine adduct which is of an epoxy resin that has been reacted with an amine, and a blocked polyisocyanate crosslinking agent; wherein the improvement is the use of an alkane sulfonic acid as the neutralizing agent for the epoxy amine adduct to provide an electrocoating composition having improved throw power.

5 Claims, No Drawings

CATHODIC ELECTROCOATING COMPOSITIONS CONTAINING METHANE SULFONIC ACID AS A NEUTRALIZING AGENT

BACKGROUND OF THE INVENTION

This invention is directed to a cathodic electrocoating composition and in particular to a cathodic electrocoating composition containing an alkane sulfonic acid neutralizing agent.

The coating of electrically conductive substrates by an electrodeposition process also called an electrocoating process is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with pigment, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

A wide variety of acids have been used to neutralize the polyepoxide amine adduct of the electrocoating bath such as sulfamic acid, toluene sulfonic acid, inorganic mineral acids, acetic acid, oxalic acid, formic acid, trichloro acetic acid and the like. Such acids are disclosed in Stromberg U.S. Pat. No. 3,681,224 issued Aug. 1, 1972; Kempter et al U.S. Pat. No. 4,647,604 issued Mar. 3, 1987; Kempter et al U.S. Pat. No. 4,594,403 issued Jun. 10, 1986; and Corrigan et al U.S. Pat. No. 4,933,056 issued Jun. 12, 1990. Weak acids do not provide the increase in throw power desired for many applications.

Throw power of electrocoating compositions continues to be a problem. Throw power is the degree to which an electrodeposited film penetrates and coats the surfaces of recessed interior areas of an automobile or truck body. Electrodeposition of coatings follows the force lines of the electrical field that exists in an electrocoating bath between the cathode and the anode. These force lines diminish as they penetrate into the recessed areas of the auto or truck body and cease to exist when the recessed area is too deep and a coating will not be deposited into such an area.

As automobile and truck body designs change, there is a need for electrocoating compositions that have increased throw power and that will penetrate and coat recessed areas. The improved composition of this invention has increased throwing power along with other desirable characteristics such as lower organic volatile compounds and smaller dispersed binder particles.

SUMMARY OF THE INVENTION

An improved aqueous cathodic electrocoating composition having a binder of an epoxy-amine adduct which is of an epoxy resin that has been reacted with an amine, and a blocked polyisocyanate crosslinking agent; wherein the improvement is the use of an alkane sulfonic acid as the neutralizing agent for the epoxy amine adduct to provide an electrocoating composition having improved throw power.

DETAILED DESCRIPTION OF THE INVENTION

The use of an alkane sulfonic acid as the neutralizing agent in an electrocoating composition provides a composition that has improved throw power, lower application voltages, improved film thickness in recessed areas and smaller dispersed binder particles in the composition. The resulting electrocoating composition preferably has a pH of about 5.5–8. Typically useful alkane sulfonic acids are methane sulfonic acid, ethane sulfonic acid, propane sulfonic acid and the like with methane sulfonic being preferred because of its relatively low cost and availability. Substituted alkane sulfonic acids also can be used as a neutralizing agent and provide results that are similar to alkane sulfonic acids; typically useful substituted acids are hydroxy ethane sulfonic acid and hydroxy propane sulfonic acid.

A typical electrocoating composition is an aqueous composition having a solids content of about 5–50% by weight of a principal emulsion of a cathodic film forming resin and a blocked polyisocyanate crosslinking agent, additives, pigment dispersant resin, pigments and the like and the composition usually contains organic coalescing solvents.

The cathodic film forming binder of the principal emulsion used to form the cathodic electrocoating composition is an epoxy amine adduct and a blocked polyisocyanate crosslinking agent and is dispersed in an aqueous medium. The epoxy amine adduct is formed of an epoxy resin which preferably is chain extended and then reacted with an amine. Typical aqueous cationic electrocoating compositions are shown in DebRoy et al U.S. Pat. No. 5,070,149 issued Dec. 3, 1991 and the aforementioned U.S. Pat. Nos. 3,922,253; 4,419,467; 4,137,140 and 4,468,307.

The epoxy resin used in the epoxy amine adduct is a poly epoxy hydroxy ether resin having an epoxy equivalent weight of about 100–2000.

Epoxy equivalent weight is the weight of resin in grams which contains one gram equivalent of epoxy.

These epoxy resins can be any epoxy hydroxy containing polymer having a 1,2 epoxy equivalency of two or more epoxy groups per molecule. The preferred are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol) ethane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-bis (hydroxymethyl)cyclohexane, 1,3-bis(hydroxymethyl) cyclohexane, 1,2 cyclohexane diol, 1,4 cyclohexane diol and hydrogenated bisphenol A.

The polyepoxides hydroxy ether resins can be chain extended with any of the aforementioned polyhydric phenols, the preferred being bisphenol A, polyether or a polyester polyols which enhances flow and coalescence. Typical useful polyol chain extenders are polycaprolactone diols such as Tone 200® series available from Union Carbide Corporation, polyoxypropylene diamine such as Jeffamine D-2000® having a molecular weight of about 2000 available from Texaco Chemical Company and ethyoxylated Bisphenol A such as SYNFAC 8009® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

Typical catalysts that are used in the formation of these polyepoxy hydroxy ether resins are tertiary amines such as dimethyl benzyl amine and organometallic complexes such as triphenyl phosphonium iodide.

Ketimines can be used in this invention with the epoxy amine adduct and are prepared from ketones and primary amines. The water formed is removed, for example, by azeotropic distillation. Useful ketones include dialkyl, diaryl and alkylaryl ketones having 3–13 carbons atoms. Specific examples include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylene diamine, 1,3-diamopropane, 1,4-diaminobutane, 1,6-diaminohexane, 4,9-dioxadodecone, 1,12-diamine and the like. One typically useful ketimine is diketimine which is the ketimine of diethylene triamine and methyl isobutyl ketone.

Typically useful primary and secondary amines used to form the epoxy amine adduct are diethyl amine, methyl ethyl amine, methyl ethanol amine, ethyl ethanol amine, mono ethanol amine, ethyl amine, dimethyl amine, diethyl amine, propyl amine, dipropyl amine, isopropyl amine, diisopropyl amine, butyl amine, dibutyl amine and the like. Alkanol amines such as methyl ethanol amine are preferred.

The polyisocyanate crosslinking agents that are used are well known in the prior art. These are aliphatic, cycloaliphatic and aromatic isocyanates such as hexamethylene diisocyanate, cyclohexamethylene diisocyanate, toluene diisocyanate, methylene diphenyl diisocyanate and the like. Methylene diphenyl diisocyanate is preferred. These isocyanates are pre-reacted with a blocking agent such as oximes, alcohols, or caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The binder of the electrocoating composition typically contains about 20–80% by weight of the epoxy amine adduct and correspondingly 80–20% of the blocked isocyanate and are the principal resinous ingredients in the electrocoating composition.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used. After grinding, the particle size of the pigment should be as small as practical, generally, the particle size is about 6–8 using a Hegman grinding gauge.

Pigments which can be used in this invention include titanium dioxide, basic lead silicate, strontium chromate, carbon black, iron oxide, zinc hydroxy phosphite, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have been found to adversely affect coalescence and flow.

The electrocoating composition of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of the binder of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight of the binder of the composition.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.02 to 10 microns, preferably, less than 1 micron. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

The electrocoating composition of this invention is used in a conventional cathodic electrocoating process. The electrocoating tank contains two electrically conductive electrodes; the anode which is part of the electrocoating tank and the cathode which is the object that is to be coated such as an auto body or auto part. An adherent film is deposited on the cathode when a sufficient voltage is impressed between the two electrodes. The voltages that are applied may be varied depending on the type of coating and on coating thickness and throw power required and may be as low as 1 volt or as high as several thousand volts. Typical voltages used are between about 50–500 volts. The current density usually is between 0.5 and 5 amperes per square foot and decreases during electrodeposition indicating that an insulating film is being deposited. A variety of substrates can be electrocoated with the composition of this invention such as steel, phosphatized steel, galvanized steel, copper, aluminum, magnesium and various plastics coated with an electrically conductive coating.

After the coating has been electrocoated, it is cured by baking at elevated temperatures such as 90°–160° C. for about 1–40 minutes.

The electrocoating composition of this invention which has been neutralized with an alkane sulfonic acid forms a stable dispersion and surprisingly has good throw power and has improved wedge in comparison to electrocoating compositions neutralized with other organic acids such as formic acid, acetic acid and glycolic acid. Throw power is a property of an electrocoating composition to coat out a film on an object at varying distances from the counter electrode at the same density of the film. Wedge is the distance from a counter electrode a film 0.5 mils thick is coated at a given voltage. Tests to determine throw power and wedge are described in the following example.

The following example illustrates the invention. All parts and percentages are on a weight basis unless indicated otherwise.

EXAMPLE

Crosslinker Resin Solution

The following ingredients were charged into a suitably equipped reactor:

|  | Parts by Weight |
|---|---|
| Portion 1 | |
| MDI (methylene diphenyl diisocyanate) | 1705.80 |
| Methyl isobutyl ketone | 402.30 |
| Dibutyl tin dilaurate | 0.40 |
| Portion 2 | |
| Alcohol Blend (72.5–73.5% diethylene glycol monobutyl ether, 15.5–16.5% ethanol and 10.5–11.5% methanol) | 1106.70 |
| Portion 3 | |
| Methyl isobutyl ketone | 52.10 |
| Portion 4 | |
| Butyl alcohol | 9.40 |
| Methyl isobutyl ketone | 473.30 |
| Total | 3750.00 |

Portion 1 was charged into the reactor and heated to 74°–76° C. Portion 2 was fed into the reactor at a constant rate over a 120 minute period. The temperature of the reaction mixture was held at about 107° C. and the reaction mixture was held at about 107° C. for an additional 3 hours. Portion 3 was added and Portion 4 was added and the reaction mixture was cooled to ambient temperature.

The resulting crosslinker resin solution of a blocked isocyanate had a weight solids content of about 75% and a Gardner Holdt viscosity measured at 25° C. of about R-U.

Electrocoating Resin Solution

|  | Parts by Weight |
|---|---|
| Portion 1 | |
| EPONO ® 828 (diglycidyl ether of bisphenol A having an epoxy equivalent weight of 188) | 2384.30 |
| Synfac ® 8009 (ethoxylated bisphenol A having an epoxy equivalent weight of 247) | 850.40 |
| Xylene | 202.20 |
| Bisphenol A | 684.40 |
| Portion 2 | |
| Dimethyl benzylamine | 4.10 |
| Portion 3 | |
| Dimethyl benzylamine | 8.20 |
| Portion 4 | |
| Crosslinker Resin Solution (prepared above) | 3428.80 |
| Portion 5 | |
| Diketimine Resin Solution (75% resin solids in methyl isobutyl ketone; diketimine resin is the reaction product of 2 moles of methyl isobutyl ketone and 1 mole of diethylene triamine and has a weight average molecular weight of about 375) | 271.50 |
| Portion 6 | |
| N-(2 hydroxyethyl)-n-methyl amine | 224.80 |
| Portion 7 | |
| Nonionic surfactant (aryl poloxy ethyl ether) | 113.80 |
| Portion 8 | |
| Methyl ethyl ketone | 1892.50 |
| Total | 10,065.00 |

Portion 1 is charged into the reactor and heated to about 145°–147° C. Portion 2 is added and the reaction mixture is held at about 160°–200° C. for about 2 hours to form a polymer having an epoxy equivalent weight of about 575–750. Then the reaction mixture is cooled to about 143°–146° C. and Portion 3 is added and the reaction mixture is held at this temperature until a polymer is formed having an epoxy equivalent weight of about 1030–1070. The resulting polymer solution is cooled to about 106°–108° C. and Portion 4 is added with mixing. Portion 5 is added with mixing. Portion 6 is added with mixing and the mixture is held at 120°–122° C. for about 1 hour. Portion 7 is added and mixed for 30 minutes and then the mixture is cooled to 80° C. and Portion 8 is added and mixed.

The resulting electrocoating resin solution had a 70% solids content.

An emulsion A was prepared by blending together the following constituents:

|  | Parts by Weight |
|---|---|
| Portion 1 | |
| Electrocoating Resin Solution (prepared above) | 1652.78 |
| Portion 2 | |

-continued

| | Parts by Weight |
|---|---|
| Methane Sulfonic Acid (MSA) Solution (10% aqueous solution) Portion 3 | 360.70 |
| Deionized water | 269.03 |
| Surfactant blend (mixture of tetra decynediol, 2-butoxy ethanol, coconut imidazoline and acetic acid.) Portion 4 | 18.50 |
| Deionized water | 1974.00 |
| Total | 4275.01 |

Portion 1 was added to a mixing vessel and then Portion 2 was added and mixed for 10 minutes. Portion 3 was added and mixed for 15 minutes and then Portion 4 was added and mixed to form the emulsion. The emulsion was agitated and held at a temperature of about 50° C. for several hours to evaporate all of the organic solvent present in the emulsion. Weight solids of the emulsion were adjusted to 33% by the addition of water. The particle size of the emulsion measured as described hereinafter was 91 NM (nanometers).

An emulsion B was prepared as follows:

| | Parts by Weight |
|---|---|
| Portion 1 | |
| Emulsion A (prepared above) Portion 2 | 3121.41 |
| Crater correcting additive Portion 3 | 172.48 |
| Anticrater additive Portion 4 | 100.80 |
| Deionized water | 104.31 |
| Total | 3500.00 |

Portion 1 was added to a mixing vessel and then Portion 2 was added and mixed for 15 minutes. Portion 3 was added and mixed for 15 minutes and then Portion 4 was added and mixed for 1 hour.

An electrocoating bath was prepared by mixing the following constituents:

| | Parts by Weight |
|---|---|
| Portion 1 | |
| Emulsion B (prepared above) | 3472.19 |
| Deionized water Portion 2 | 1516.44 |
| Pigment Paste (Described in col. 6 lines 45–54 of U.S. Pat. No. 5,356,960) Portion 3 | 776.23 |
| Deionized water | 1735.14 |
| Total | 7500.00 |

Portion 1 was charged into a mixing vessel and mixed for 15 minutes. Portion 2 was added with mixing over a 5 minute period and mixed for an additional 15 minutes and then Portion 3 was added and mixed. The resulting electrocoating bath composition had a solids content of 33% and a particle size of 91 NM (nanometers).

Electrocoating baths B–E were similarly formulated except the following acids were used instead of methane sulfonic acid:

Bath B—Formic Acid

Bath C—Lactic Acid

Bath D—Glycolic Acid

Bath E—Acetic Acid

The following tests were conducted on each of the baths and the results are shown in Table I. After being electrocoated each of the panel was baked for 30 minutes at about 163° C.

PS—Particle Size of the bath emulsion was measured with a Coulter Model LS150 Automated Laser Based Particle Size Analyzer made by Coulter Scientific Instruments.

pH—measured with pH meter.

COND—conductivity measured with a USI Model 35 Conductivity Meter made by Yellow Springs Instrument Co. Inc., Yellow Springs, Ohio and measured in microsiemens.

Vc—Voltage to achieve 0.85 mil film thickness on the exterior of the box used in the following throw power test.

THROW—Throw power was determined at Vc and 2 minutes deposition time according to Ford Laboratory Test Method MJ BI 20-2C using a box formed of two of 12×4 inch phosphatized steel panels. Throw which is the distance the coating deposits i.e. zero film thickness, inside the box was measured in millimeters.

WEDGE—Distance inside the box used in the above Throw test in which the film thickness is 0.5 mils thick at Vc.

The results shown in Table I are summarized below:

Electrocoating Composition A neutralized with methane sulfonic acid in comparison to Electrocoating Composition B neutralized with formic acid has a smaller particle size emulsion which indicates longer bath stability time period, lower Vc, and higher Throw.

Electrocoating Composition A in comparison to Electrocoating Composition C neutralized with latic acid has a smaller particle size, lower Vc, higher Throw and higher wedge.

Electrocoating Composition A in comparison to Electrocoating Composition D neutralized with glycolic acid has a smaller particle size, higher Throw and higher wedge.

Electrocoating Composition A in comparison to Electrocoating Composition E neutralized with acetic acid has a smaller particle size, higher Throw and higher wedge.

TABLE I

| ELECTROCOATING BATH | ACID | pH | COND | Vc | THROW | 0.5 MIL WEDGE |
|---|---|---|---|---|---|---|
| A | MSA | 6.04 | 1973 | 200 | 194 | 55 |
| | PS | 91 NM | | | | |
| B | FORMIC | 6.09 | 2540 | 210 | 184 | 62 |
| | PS | 169 NM | | | | |
| C | LACTIC | 5.99 | 1738 | 210 | 181 | 41 |

TABLE I-continued

| ELECTRO-COATING BATH | ACID | pH | COND | Vc | THROW | 0.5 MIL WEDGE |
|---|---|---|---|---|---|---|
| D | PS GLY-COLIC PS | 133 NM 6.03 129 NM | 1908 | 190 | 180 | 45 |
| E | PS ACETIC PS | 133 NM 6.07 135 NM | 1890 | 200 | 179 | 40 |

We claim:

1. An improved aqueous cathodic electrocoating composition comprising a binder of an epoxy-amine adduct of an epoxy resin that has been reacted with an amine, and a blocked polyisocyanate crosslinking agent; wherein the improvement consists of the use of methane sulfonic acid as the neutralizing agent for the epoxy amine adduct to provide an electrocoating composition having improved throw power.

2. The improved cathodic electrocoating composition of claim 1 which contains sufficient methane sulfonic acid to provide a composition having a pH of about 5.5–8.

3. The improved cathodic electrocoating composition of claim 2 in which the epoxy amine adduct comprises polyepoxy hydroxy ether resin extended with a dihydric phenol and reacted with an amine.

4. A substrate coated with a dried and cured layer of the composition of claim 1.

5. In a method of preparing a cathodic electrocoating composition comprising the following steps in any workable order:

(a) preparing an epoxy resin-amine adduct;
(b) preparing a blocked polyisocyanate crosslinking agent;
(c) blending the epoxy-amine adduct with the blocked polyisocyanate crosslinking agent;
(d) neutralizing the epoxy-amine adduct with an organic acid to form an emulsion;
(e) blending the emulsion with a pigment paste;

wherein the improvement consists essentially of the addition of an organic acid which consists of methane sulfonic acid to provide an electrocoating composition having improved throw power.

* * * * *